(12) United States Patent
Voorhees et al.

(10) Patent No.: US 11,467,868 B1
(45) Date of Patent: Oct. 11, 2022

(54) SERVICE RELATIONSHIP ORCHESTRATION SERVICE

(71) Applicant: Amazon Technologies, Inc., Seattle, WA (US)

(72) Inventors: William Voorhees, Seattle, WA (US); Jason Brewster, Seattle, WA (US); Venumadhav Yalla, Seattle, WA (US); Vilcya Wirantana, Seattle, WA (US); Gunnar Onarheim, Seattle, WA (US); Peter Reidy, Seattle, WA (US); Xiao Kun Yao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 378 days.

(21) Appl. No.: 15/585,593

(22) Filed: May 3, 2017

(51) Int. Cl.
*G06F 9/48* (2006.01)
*G06F 9/46* (2006.01)
*G06F 9/50* (2006.01)
*G06F 9/54* (2006.01)
*H04L 67/02* (2022.01)

(52) U.S. Cl.
CPC ............ *G06F 9/4881* (2013.01); *G06F 9/466* (2013.01); *G06F 9/5005* (2013.01); *G06F 9/547* (2013.01); *H04L 67/02* (2013.01)

(58) Field of Classification Search
CPC ..... H04L 67/10; H04L 63/1425; H04L 67/02; H04L 67/51; H04L 67/56; G06F 8/20; G06F 8/30; G06F 8/34; G06F 8/36; G06F 9/46; G06F 9/465; G06F 9/5055
See application file for complete search history.

(56) References Cited

U.S. PATENT DOCUMENTS

| | | | | |
|---|---|---|---|---|
| 7,254,814 B1* | 8/2007 | Cormier | ............ | G06F 9/44526 717/120 |
| 7,472,349 B1* | 12/2008 | Srivastava | ............... | G06F 9/44 |
| 8,117,278 B2* | 2/2012 | Maes | .................. | H04L 41/5054 709/217 |
| 8,966,479 B2* | 2/2015 | Nayak | ..................... | H04L 67/16 718/1 |
| 2002/0169881 A1* | 11/2002 | Fritsche | .................... | H04L 9/40 709/225 |
| 2004/0034767 A1* | 2/2004 | Robinson | .................. | H04L 9/32 713/152 |
| 2004/0044987 A1* | 3/2004 | Kompalli | .................. | G06F 8/20 717/100 |
| 2005/0027871 A1* | 2/2005 | Bradley et al. | ......... | G06F 15/16 |
| 2006/0143031 A1* | 6/2006 | Bou-Ghannam | ......... | G06F 8/36 709/224 |
| 2008/0244606 A1* | 10/2008 | Wylie | .................... | G06F 9/5066 718/104 |

(Continued)

*Primary Examiner* — Lewis A Bullock, Jr.
*Assistant Examiner* — Gilles R Kepnang
(74) *Attorney, Agent, or Firm* — Davis Wright Tremaine LLP

(57) ABSTRACT

An orchestration service enables simplified establishment of relationships between services. Attributes and other information associated with a service are defined in a service definition. The information from the service definition is utilized by the orchestration service during execution of one or more workflows to establish a relationship between services. The workflow includes a set of operations that establishes the relationship based at least in part on the service definition.

20 Claims, 8 Drawing Sheets

(56) References Cited

U.S. PATENT DOCUMENTS

| | | | | |
|---|---|---|---|---|
| 2010/0010858 A1* | 1/2010 | Matoba | G06F 9/5038 | 705/7.27 |
| 2010/0017368 A1* | 1/2010 | Mao | G06F 9/5055 | 707/E17.014 |
| 2010/0146041 A1* | 6/2010 | Gentry | G06F 15/173 | 709/203 |
| 2010/0325165 A1* | 12/2010 | Kriegesmann | G06Q 10/10 | 707/802 |
| 2011/0029977 A1* | 2/2011 | Ramanathaiah | G06F 9/5038 | 718/102 |
| 2013/0019013 A1* | 1/2013 | Rice | H04L 61/1511 | 709/225 |
| 2013/0073591 A1* | 3/2013 | Rolia | G06F 16/903 | |
| 2013/0166703 A1* | 6/2013 | Hammer | H04L 41/50 | 709/220 |
| 2013/0227147 A1* | 8/2013 | Ponnavaikko | H04L 41/5083 | 709/227 |
| 2013/0339947 A1* | 12/2013 | Neary et al. | G06F 9/455 | |
| 2014/0052877 A1* | 2/2014 | Mao | H04L 12/4641 | 709/245 |
| 2014/0075021 A1* | 3/2014 | Revanuru | H04L 41/5041 | 709/224 |
| 2014/0075027 A1* | 3/2014 | Chatterjee | H04L 41/5041 | 709/225 |
| 2014/0129389 A1* | 5/2014 | Patel | H04L 41/5051 | 705/26.62 |
| 2014/0259094 A1* | 9/2014 | Narayanaswamy | H04L 63/1425 | 726/1 |
| 2014/0317639 A1* | 10/2014 | You et al. | G06F 9/44526 | |
| 2014/0337816 A1* | 11/2014 | Chiluvuri | G06F 8/36 | 717/107 |
| 2015/0163179 A1* | 6/2015 | Maes | G06F 9/546 | 709/206 |
| 2015/0195177 A1* | 7/2015 | Peng et al. | H04L 43/10 | |
| 2016/0072815 A1* | 3/2016 | Rieke | H04L 63/101 | 726/3 |
| 2017/0046134 A1* | 2/2017 | Straub | G06F 8/34 | |
| 2017/0251013 A1* | 8/2017 | Kirti | H04L 63/1408 | |

* cited by examiner

SERVICE RELATIONSHIP ORCHESTRATION SERVICE

BACKGROUND

A data center is a facility that houses computer systems and various networking, storage, and other related components. Data centers may, for example, provide computing services to businesses and individuals as remote computing services or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. In addition, these services may leverage other services and computing resources to provide functionality. For example, two or more services may communicate over various networks using various computing resources distributed among various data centers to perform an operation of a particular service.

In a large distributed computing system (e.g., multiple distributed data centers) of a computing resource service provider, various customers, users, services, and resources of the computing resource service provider are in frequent communication with each other. Keeping the system secure, connected, and easy to use becomes more challenging as applications and services are updated and as the complexity and usage of the system increases. In such distributed computing systems, it can be difficult to identify the computing resources of the system that should communicate with one another. Furthermore, it can also be difficult to isolate and troubleshoot issues with the system, and even when issues are identified, reliably securing and setting up the system may be challenging. Additionally, many conventional systems rely upon manual setup, monitoring, and modification. The complexity and distribution of computing resources in these environments may make it difficult to collect, analyze, and organize information generated by the computing resources.

BRIEF DESCRIPTION OF THE DRAWINGS

Various techniques will be described with reference to the drawings, in which.

DETAILED DESCRIPTION

Figure 1:
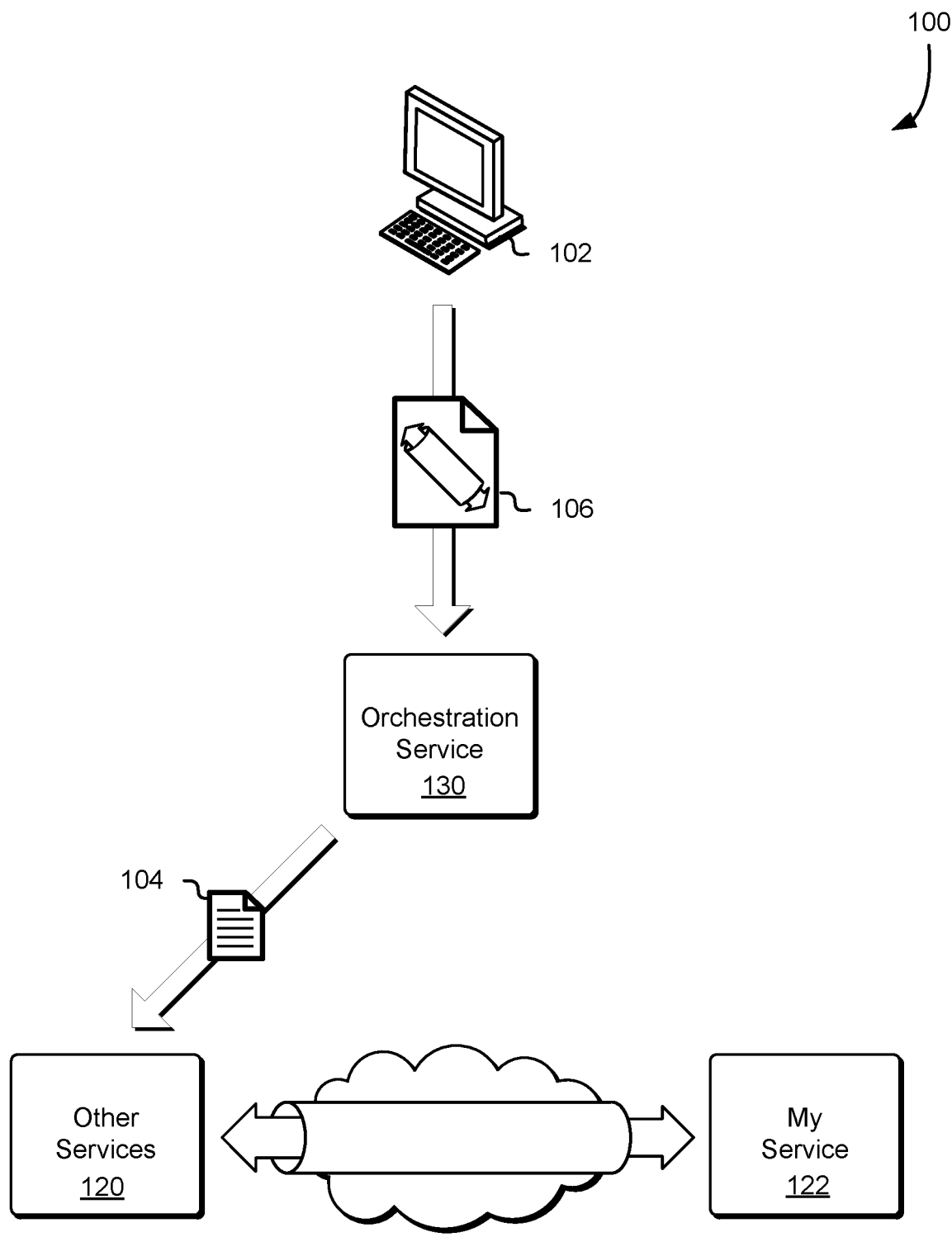
FIG. 1 illustrates an environment in which an orchestration service negotiates a relationship between two or more services in accordance with at least one embodiment.

In various examples described below, an orchestration service provides user the ability to establish relationships between services. The orchestration service provides various tools and mechanisms that provide a unified mechanism for authorizing and establishing connections between services. In addition, different types of access (e.g., network connectivity, application authorization, access control policy, etc.) are managed by the orchestration service. In an embodiment, to provide establishment of relationships between services, the orchestration service executes a set of plug-ins that each perform a different a workflow including a set of operations to establish the relationship between the services. In addition to the plug-ins, the orchestration service may maintain a set of service definitions that includes information about a particular service or computing resource. A particular service definition, in an embodiment, includes information used by the computing resources executing a particular plug-in to establish the relationship between services.

For example, a particular plug-in includes a set of instructions or other executable code that, as a result of being executed by a computer system, causes the computer system to transmit a request to a policy service to allow a particular service access to a particular computing resource (e.g., storage location, other service, virtual machine, or other computing resource). The particular plug-in may obtain information about the particular service, the access requested by the service, the particular computing resources the particular service is attempting to establish a relationship with, or any other information necessary to perform one or more operations of a workflow defined by the particular plug-in. In addition to establishing relationships between services, the orchestration service may also collect and monitor information associated with services. In an embodiment, the collected information includes configuration information (e.g., information associated with how a particular service is setup) and usage information (e.g., information associated with the operation of a particular service which may include configuration information).

The orchestration service may also provide analysis of service configuration, baselining for service relationships, and detection of existing or potential service relationships based at least in part on the information collected by the orchestration service. For example, the orchestration service can detect that a service's security policy is over inclusive because at least one computing resources of the service has privilege to access computing resources that the at least one computing resources does not communicate with. In response, the orchestration service transmits a notification to an entity associated with the service indicating that the service security policy may include unnecessary or utilized privileges. In another example, the orchestration service provides templates or suggested service configurations based at least in part on collected configuration data. The suggested service configurations may indicate relationships between services that can be used to implement various types of services. The orchestration service may provide a user interface or other interface (e.g., service interface) through which developers or other entity may manage, create, and modify relationships between services which may be implemented using computing resources of a computing resource service provider and/or other entity (e.g., the developer's own computing resources or computing resources of other service providers).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which an orchestration service 130 established a relationship between services in accordance with an embodiment. As described in greater detail below, a computing resource service provider may provide the orchestration service 130 to enable users 102 (e.g., application developers) to create, modify, and/or delete relationships between services. For example, the user 102 may provide a service illustrated in FIG. 1 as "my service" 122 which provides software as a service to other users and services. In addition, at least some operation of my service 122 may depend on a relationship with other services 120. The relationship may be established based at least in part on a service definition 106 provided by the user 102 to the orchestration service 130. In addition, as described in greater detail below, the relationship may include various types of relationships or access between my service 122 and the other services 120. The other services 120 may include a variety of different services described in the present disclosure, such as any of the services described in greater detail in connection with FIG. 1.

Returning to FIG. 1, the service definition 106 may include a structure or instructed data object including information associated with my service 122. In one embodiment, the service definition 106 is an unstructured JavaScript Object Notation (JSON) blob or data object. The service definition 106 may include any information associated with the service such as service name, computing resources executing the service, data objects of the service, network information of the service, organizational information associated with the service, security information associated with the service, compliance information or industry standards associated with the service, policy information associated with the service, or any other information associated with the service suitable for establishing a relationship with another service. The orchestration service 130 may provide an interface or other mechanism to enable the user 102 to provide the service definition. For example, as described in greater detail below in connection with FIG. 5, the orchestration service may provide a user interface, exposed as a webpage, to the user 102 to guide and/or aid the user 102 through the process of creating the service definition 106.

The orchestration service 130, in various embodiments, maintains a data store and/or database of service definitions. In addition, the service definitions 106 may be indexed or otherwise organized such that particular information may be queried and obtained. For example, when executing a particular plug-in for establishing a relationship with a particular service, the orchestration service 130 queries the data store to obtain the information required to establish the relationship with the particular service, such as service name, service address, service dependencies, or any other information suitable for establishing the relationship. As described in greater detail below, the orchestration service 130 may execute the plug-in, the plug-in may cause operations to be performed internal to the orchestration service 130 (e.g., operations on computing resources associated with the orchestration service 130) and/or external operation to the orchestration service 130 (e.g., external service calls to computing resources associated with other services 120).

In various embodiments, the orchestration service 130 transmits relationship information 104 to the other services 120, the relationship information 104 causes the other services 120 to perform various operations to establish a relationship between my service 122 and other services 120. The relationship information 104 may include information obtained from the service definition 106 and/or additional information obtained from the user 102. In one example, the relationship information 104 includes a service name and service address from the service definition 106 as well as credentials or other token from the user 102. Furthermore, the relationship information 104 may be included in a service call such as an application program interface (API) call or web service call to the other services 120.

For example, the orchestration service 130 generates an API call based at least in part on the service definition. The API call once received by the other service 120 cause the other service 120 to perform one or more operations to establish a relationship between my service 122 and the other services 120. These API calls may be generated as a result of executing the plug-in as described in greater detail below. In addition, the relationship information 104 may be directed to a particular service responsible for establishing at least a portion of the relationship, but the particular service may not be part of the relationship established. For example, a policy service may receive relationship information 104 which causes the policy service to modify the policy for a storage service to allow my service 122 to communicate with the storage service without violating a policy associated with the storage service.

Figure 2:
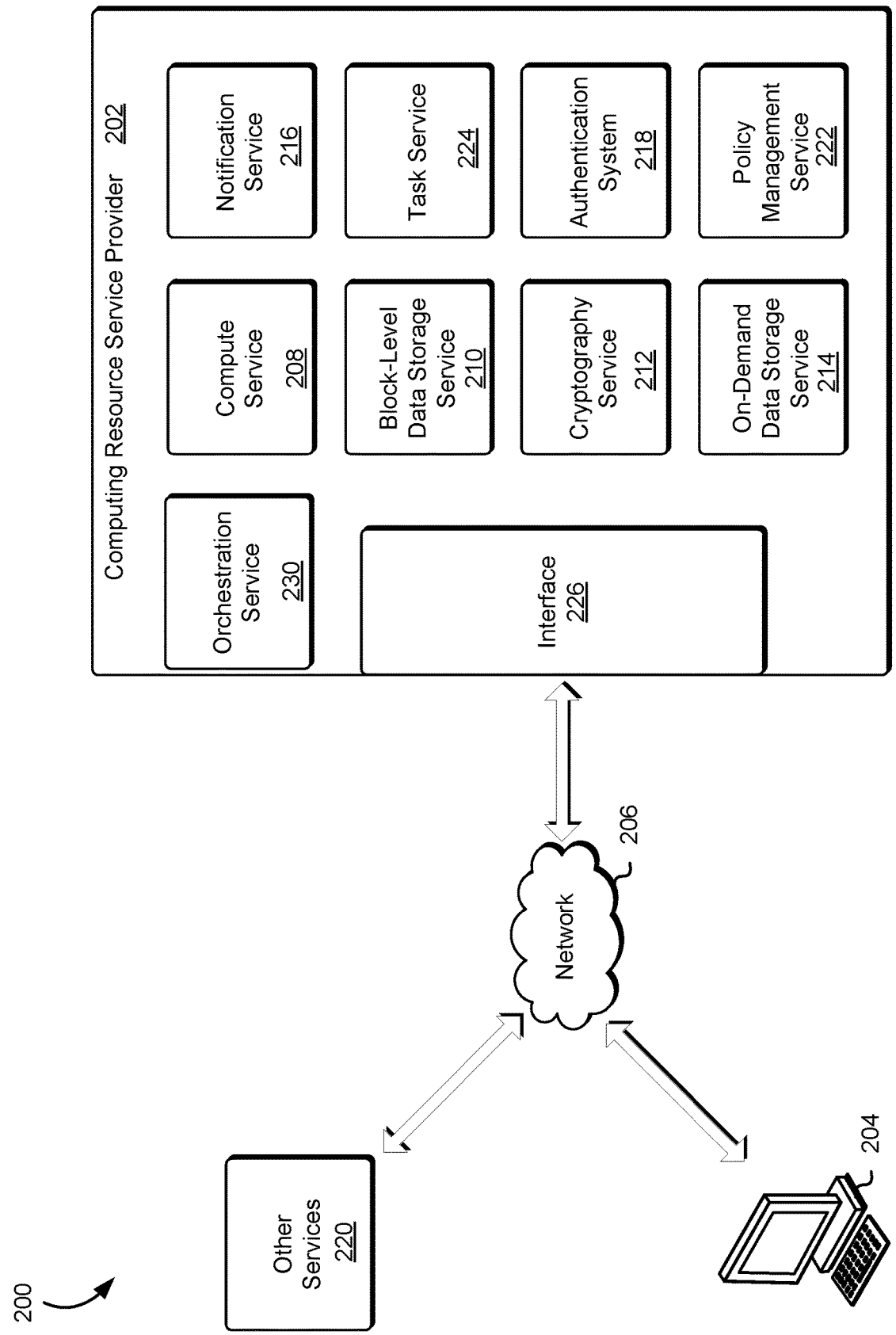
FIG. 2 illustrates an environment in which an orchestration service provided by a computing resource service provider negotiates a relationship between two or more services, including other services operated by a third party, in accordance with at least one embodiment.

FIG. 2 shows an example of a customer 204 connected to a computing resource service provider in accordance with at least one embodiment. The computing resource service provider 202 may provide a variety of services to the customer 204 and the customer 204 may communicate with the computing resource service provider 202 via an interface 226, which may be a web services interface or any other type of customer interface. While FIG. 2 shows one interface 226 for the services of the computing resource service provider 202, each service may have its own interface and, generally, subsets of the services may have corresponding interfaces in addition to or as an alternative to the interface 226. The customer 204 may be an organization or users as described above that may utilize one or more of the services provided by the computing resource service provider 202 to maintain and deliver information and/or services to other customers and/or users, which may be located in various geographical locations.

Additionally, the customer 204 may be an individual that utilizes the services of the computing resource service provider 202 to deliver content or provide services to computing resources or other entities located remotely. As shown in FIG. 2, the customer 204 may communicate with the computing resource service provider 202 through a network 206; the network 206 may be a communication network, such as the Internet, an intranet or an Internet service provider (ISP) network. Some communications from the customer 204 to the computing resource service provider 202 may cause the computing resource service provider 202 to operate in accordance with one or more embodiments described in the present disclosure or variations thereof.

The computing resource service provider 202 may provide various computing resource services to the customer 204. The services provided by the computing resource service provider 202, in this example, include an orchestration service 230, a compute service 208, a block-level data storage service 210, a cryptography service 212, an on-demand data storage service 214, a notification service 216, an authentication system 218, a policy management service 222, and a task service 224. In addition, the orchestration service 230 may provide access to one or more other services 220 as described in greater detail below. The other services 220, in various embodiments, are provided by separate entity from the computing resource service provider 202. In one example, the other services 220 include computing resources in a data center operated by the customer 204.

It is noted that not all embodiments described include the services 208-230 described with reference to FIG. 2 and additional services may be provided in addition to or as an alternative to services explicitly described. As described, each of the services 208-230 may include one or more web service interfaces that enable the customer 204 to submit service calls such as appropriately configured API calls to the various services through web service requests. In addition, each of the services may include one or more service interfaces that enable the services to access each other (e.g., to enable orchestration service 230 to establish a relationship between the compute service 208 and the on-demand data storage service 214 to enable the compute service 208 to store data in or retrieve data from the on-demand data storage service 214).

In various embodiments, the compute service 208 includes one or more server computer systems providing physical resources used to instantiate virtual machine instances and/or container instances on behalf of the customer 204. For example, a server computer includes a hypervisors that provides virtual machines with access to the underlying physical resources of the server computer system such as memory and processors. The customer 204 may interact with the compute service 208 (e.g., via appropriately configured and authenticated API calls) to provision and operate computing resources that are instantiated on physical computing devices hosted and operated by the computing resource service provider 202. The virtual machine instances and/or container instances may be used for various purposes, such as to operate as servers supporting a website, to operate business applications or, generally, to serve as computing power for the customer 204 and/or the applications and services operated by the customer 204. Other applications for the virtual machine instances and/or container instances may be to support database applications, electronic commerce applications, business applications, and/or other applications. Although the compute service 208 is shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

In various embodiments, the block-level data storage service 210 includes one or more computing resources that collectively operate to store data for the customer 204 using block-level storage devices (and/or virtualizations thereof). The block-level storage devices of the block-level data storage service 210 may, for instance, be operationally attached to virtual computer systems provided by the compute service 208 to serve as logical units (e.g., virtual drives) for the computer systems. A block-level storage device may enable the persistent storage of data used/generated by a corresponding virtual computer instance and/or container instance where the compute service 208 may only provide ephemeral data storage.

As illustrated in FIG. 2, the computing resource service provider 202 also includes a cryptography service 212. The cryptography service 212 may utilize one or more storage services of the computing resource service provider 202 to store keys of the customers in encrypted form, whereby the keys may be usable to decrypt customer keys accessible only to particular devices of the cryptography service 212. In general, the cryptography service 212 may perform various cryptographic operations on behalf of customers 204, services, and/or applications. For example, the cryptography service 212 receives data objects, encrypts the data objects with a particular cryptographic key, and returns an encrypted data object. Similarly, the cryptography service 212 may decrypt an encrypted data object in response to validated and/or authorized requests.

In various embodiments, the computing resource service provider 202 further includes an on-demand data storage service 214. The on-demand data storage service 214 may be implemented using one or more server computer systems providing physical resources used to synchronously process requests to store and/or access data. The on-demand data storage service 214 may operate using computing resources (e.g., databases, block-level storage devices, physical hosts, etc.) that enable the on-demand data storage service 214 to locate and retrieve data quickly, to allow data to be provided in responses to requests for the data. For example, the on-demand data storage service 214 maintains stored data in a manner such that, when a request for a data object is retrieved, the data object can be provided (or streaming of the data object can be initiated) in a response to the request.

As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects that may be used by the customer 204 to retrieve or perform other operations in connection with the data objects stored by the on-demand data storage service 214.

In the environment illustrated in FIG. 2, a notification service 216 is included. The notification service 216 includes one or more server computer systems providing physical resources used to provide notification to customers 204 through various mechanisms such as a web service or other interface. The notification service 216 can be used to configure topics for which customers 204 seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 216 may provide notifications to clients using a "push" mechanism without the need to check periodically or "poll" for new information and updates. The notification service 216 may further be used for various purposes such as monitoring applications executing in the compute service 208, workflow systems, time-sensitive information updates, mobile applications, and many others.

As illustrated in FIG. 2, the computing resource service provider 202, in various embodiments, includes an authentication system 218 and a policy management service 222. The authentication system 218, in an embodiment, is a computer system (e.g., one or more server computer systems) that performs operations involved in authentication of users and/or customers 204. For instance, one of the services 208-216 and 222-230 may provide information from a user to the authentication system 218 to receive information in return that indicates whether the user requests are authentic.

The policy management service 222, in an embodiment, is a computer system configured to manage policies on behalf of customers 204 of the computing resource service provider 202. The policy management service 222 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 202, in various embodiments, is also equipped with a task service 224. The task service 224, in an embodiment, receives a set of tasks included in a workflow and/or plug-in and enables execution of tasks as dictated by the workflow. The task service 224 may utilize various resources of the computing resource service provider 202, such as one or more instantiated virtual machines or virtual hosts, for executing tasks and/or operations thereof. For example, the task service 224 executes a set of operations to establish a relationship between two or more services included in a plug-in of the orchestration service 230.

Additionally, other entities may provide the one or more other services 220 based at least in part on the needs of its customers 204. In one example, the one or more other services 220 include a database service exposed to customer 204. The database service may include computing resources that operate to execute one or more databases for one or more customers 204. The orchestration service 230, in various embodiments, communicates with the other services over the network 206 to establish relationships between the one or more other services 220 and services of the computing resource service provider 202 or between services of the one or more other services 220. As illustrated in FIG. 2, and described in the present disclosure, a service may include any computing resources that receive requests and process the requests. For example, a service includes a container instance that receives and processes information.

Figure 3:
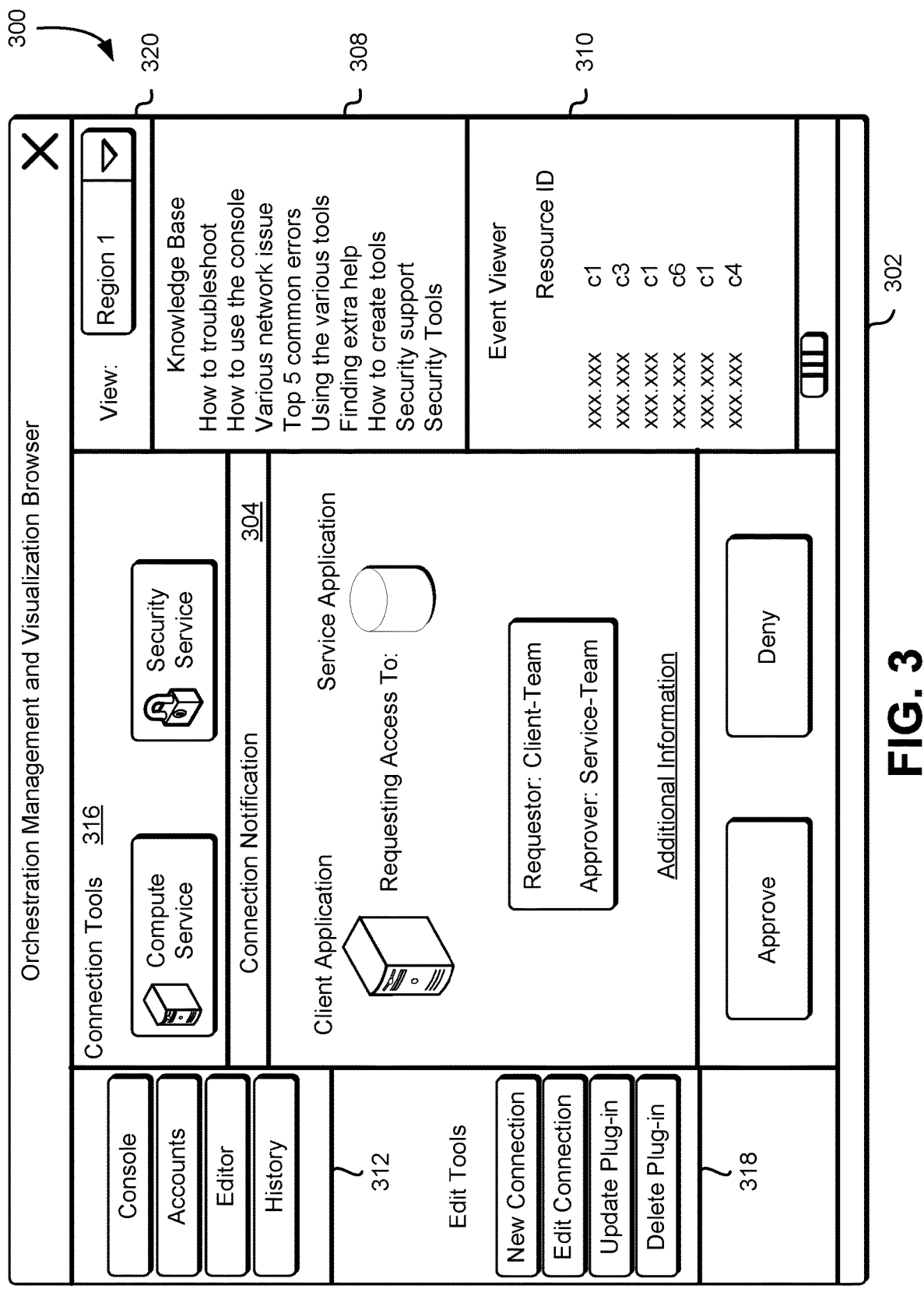
FIG. 3 is a diagram illustrating a management console exposed as a webpage for establishing relationships between services in accordance with at least one embodiment.

FIG. 3 illustrates an example environment 300 where a remote orchestration management and visualization browser 302 may be used to approve or deny the establishment of a relationship between two or more services as described in the present disclosure at least as described above in connection with FIG. 1 and in accordance with at least one embodiment. The remote orchestration management and visualization browser 302 enables a customer to generate service definitions, detect attempts to establish a connection with a service, perform security operations, troubleshoot issues associated with computing resources of a service, receive recommendations associated with the service architecture, search a knowledge base for information related to the computing resources, view service baselines, and generally diagnose, establish, and troubleshoot relationships between services. In various embodiments, the remote orchestration management and visualization browser 302 is a computer system service such as a web service and provided as an orchestration service of the computing resource service provider as described in the present disclosure.

As illustrated in FIG. 3, the remote orchestration management and visualization browser 302 is provided as a user interface executed by an application, such as a web browser executing on a computer system operated by the customer, as well as other user interfaces that may be used to present service information and relationship information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The computing resource service provider may receive the selection information from the customer's computing device and provide the information to other computing resources of the orchestration service. For example, the customer's approval of the requested access causes the computing resource executing the remote orchestration management and visualization browser 302 to transmit the approval to computing resources of the orchestration service. The user interface may be generated or caused to be generated by the orchestration service as described in the present disclosure.

The remote orchestration management and visualization browser 302 may include connection tools 316 that aid the customer in generating and/or establishing relationships between services and/or visualization thereof in the remote orchestration management and visualization browser 302. For example, the connection tools 316 may include a graphical user interface element, such as the buttons illustrated in FIG. 3, where selection of the graphical user interface element may cause the orchestration service to display information to the customer to aid the customer in establishing a relationship with a particular service or type of service indicated in the button associated with the selected graphical customer element. For example, selection of the 'Compute Service' button causes display connection information in a connection notification 304 display pane of the remote orchestration management and visualization browser 302. Based at least in part on the information displayed, the customer may establish a relationship with the displayed service.

In yet other embodiments, the orchestration service may determine services and relationships that may be established with a particular service based at least in part on the information included in the service definition for the particular service. For example, the service definition may indicate the particular service generated data objects associated with particular users. Based at least in part on this information, the orchestration service may determine that a relationship with a storage service and a policy management service can be used in execution of the particular service. The orchestration service may then cause requests to establish the determined relationships to be displayed in the connection notification 304 display pane. In yet other embodiments, the orchestration service determines a set of relationships that exist between the service and other services and/or computing resources that a not being utilized and generates suggestions indicating relationships that may be terminated and/or deleted. This type of automated connection, detection, and establishment may make the creation and maintenance of services easier and less time consuming for developers of such services.

In various embodiments, the remote orchestration management and visualization browser 302 produces the graphical representation of service information based at least in part on a set of events detected by the orchestration service. For example, the remote orchestration management and visualization browser 302, in response to a request from a customer, transmits an API call or other command to the orchestration service to obtain service information generated based at least in part on the orchestration service establishing relationships between services and monitoring the established relationships. In various embodiments, the customer is prompted to provide additional information and/or configure additional resources as a result of the operation of a plug-in to establish a relationship between services as described in greater detail below. For example, the customer is prompted to provide credentials to the orchestration service so that external service calls to one or more services can be authenticated. The graphical representation of service definition and/or service information may be displayed using tables, block diagrams, generated images, or visualization elements and may, in some embodiments, include one or more icons.

As illustrated in FIG. 3, the remote orchestration management and visualization browser 302 further includes a set of options 312 used to perform various functions in connection with the remote orchestration management and visualization browser 302. The set of options 312 may be a set of functions included in the remote orchestration management and visualization browser 302 that enables a customer to perform a variety of operations such as managing accounts, creating service definitions, and managing customer-operated computing resources. The options 312 may be configured as graphical user interface elements of the remote orchestration management and visualization browser 302.

The account button may be configured to enable the customer to select particular customer accounts to perform various operations associated with a particular service in connection with the selected customer accounts. In various embodiments, the customer operating the remote orchestration management and visualization browser 302 is required to have, at the minimum, complete read permissions across all of the customer services and computing resources associated with the accounts the customer is attempting to perform operations associated with the particular service. The editor button may be configured to enable the customer to create or edit service definitions and/or modify what information is available to the orchestration service.

In various embodiments, the customer is provided with resources to aid in determining what relationships can be established between services and what already established relationship may require attention. Once a security definition is created (e.g., by a customer or as part of an automated or partially automated process) and provided to the orchestration service, the customer may be provided with relationship information or other information indicating requirements, dependencies, privileges, connections, or access based at least in part on the service definition.

In addition, the service definition, relationship information, and other information may be saved in such a manner that the information is accessible to all customer accounts and/or all other customers of the computing resource service provider. In addition, the service definitions, relationship information, and other information may be processed (e.g., statistical comparison, machine learning, etc.) to determine a baseline and/or set of best practices for services. In this manner, service relationships setup across various customer accounts may be used to improve the process for other customers. The security definitions and/or plug-ins may also be submitted to the computing resource service provider for review and approval and after review, if the security definitions and/or plug-ins are found to be of good quality, it may be published to all customers and used as a support tool.

The remote orchestration management and visualization browser 302 may further include an event viewer 310. The event viewer 310 may be configured to provide information related to anomalous or other events detected during the operation or establishment of relationships between services. This information may provide a set of data associated with systemic, operational, or maintenance events associated with a relationship between services along with schedules and remediation suggestions. For example, the event may include information indicating a particular service attempting to connect to a storage service and whether the attempt was successful based at least in part on a set of permissions managed by a policy management service as described above.

The information displayed in the event viewer 310 may be generated automatically or in response to a request and/or operation of the customer. The remote orchestration management and visualization browser 302 may also include a knowledge base 308 which includes articles and provides access to curated content based at least in part on the information collected from customers of the computing resource service provider or generated by the computing resource service provider. The knowledge base may include suggestions on relationships and/or configurations of services for specific computing resources or suggest relevant service definitions and/or plug-ins that could be used in connection with various services. In addition, the orchestration service may suggest or recommend particular knowledge-based articles based at least in part on operational information obtained by the agents.

The customer may use editing tools 318 to edit, create, or modify existing service definitions. For example, the customer may use the editing tools 318 to edit service definitions associated with various services. In addition, the customer may be provided with the option to build a set of customer specific service definitions from a set of curated service definitions maintained by the computing resource service provider or other entity such as the orchestration service. The customer may then modify or edit the service definitions and/or add new service definitions to the set of service definitions.

Once a customer has established a connection to the orchestration service through the remote orchestration management and visualization browser 302, the remote orchestration management and visualization browser 302 may automatically populate the customer's display with the information in various components of the remote orchestration management and visualization browser 302, such as the event viewer and knowledge base.

As an operation enabled by the remote orchestration management and visualization browser 302, a customer can view different regions from a drop down menu 320. The different regions may include different geographical regions or different logical regions within the same or different geographical regions. For example, different regions may include two or more separate virtual networks. Customers may navigate to a particular group using a graphical user interface element as illustrated in FIG. 3. Selection of a particular region may limit the information and generate views of information specific to the region. In various embodiments, the customer uses or creates service definitions including information associated with particular regions and/or specific computing resources within the particular regions. The customer may use the remote orchestration management and visualization browser 302 for automated execution of a plug-in to establish relationships between services in response to a periodic or aperiodic trigger. For example, the customer, after providing a service definition to the orchestrations service, may elect to have a set of plug-ins executed automatically (e.g., without the customer providing additional contemporaneous input) in response to providing the service definition.

Figure 4:
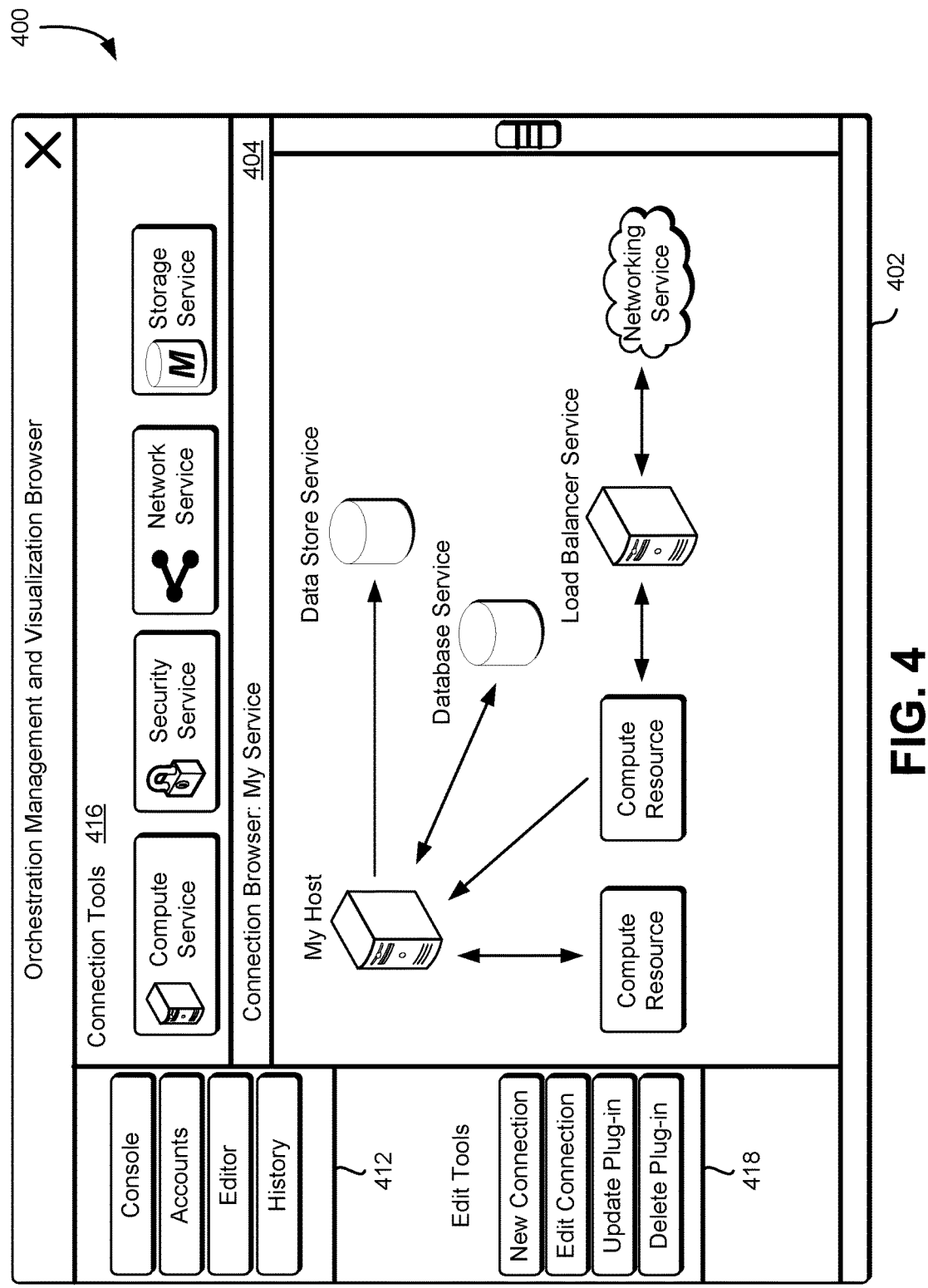
FIG. 4 is a diagram illustrating a management console exposed as a webpage for monitoring relationships between services in accordance with at least one embodiment.

FIG. 4 illustrates an example environment 400 where a remote orchestration management and visualization browser 402 may be used to view relationships between two or more services as described in the present disclosure at least as described above in connection with FIG. 1 and in accordance with at least one embodiment. The remote orchestration management and visualization browser 402 enables a customer to generate service definitions, detect attempts to establish a connection with a service, perform security operations, troubleshoot issues associated with computing resources of a service, receive recommendations associated with the service architecture, search a knowledge base for information related to the computing resources, view service baselines, and generally diagnose, establish, and troubleshoot relationships between services. In various embodiments, the remote orchestration management and visualization browser 402 is a computer system service such as a web service and provided as an orchestration service of the computing resource service provider as described in the present disclosure.

As illustrated in FIG. 4, the remote orchestration management and visualization browser 402 is provided as a user interface executed by an application, such as a web browser executing on a computer system operated by the customer, as well as other user interfaces that may be used to present service information and relationship information to the customer and may, in some embodiments, be generated by the computing resource service provider and sent to the customer's display for rendering. The remote orchestration management and visualization browser 402 may include additional embodiments and features as described above in connection with FIG. 3. In addition, the remote orchestration management and visualization browser 402 may include connection tools 416, a set of options 412, and editing tools 418 as described above in connection with FIG. 3.

As illustrated by FIG. 4, the remote orchestration management and visualization browser 402 also includes a connection browser 404. In an embodiment, the connection browser 404 allows customers to view relationships between various services and/or computing resources thereof. The relationships illustrated may include any of the relationships described in the present disclosure such as network connection, access level, privileges, white listings, black listings, dependencies, service calls, physical connections, or other service relationships. In addition, the relationships illustrated may be relative to a single service or multiple services. For example, the relationships illustrated include all the relationships between a single service and one or more other services. In another example, the relationships illustrated include all the relationships of a particular type established between a plurality of services. The customer may also be able to choose relationship information to be displayed in the connection browser 404 based at least in part on a recommendations section or search for one using relevant keywords (not shown in FIG. 4 for simplicity).

Figure 5:
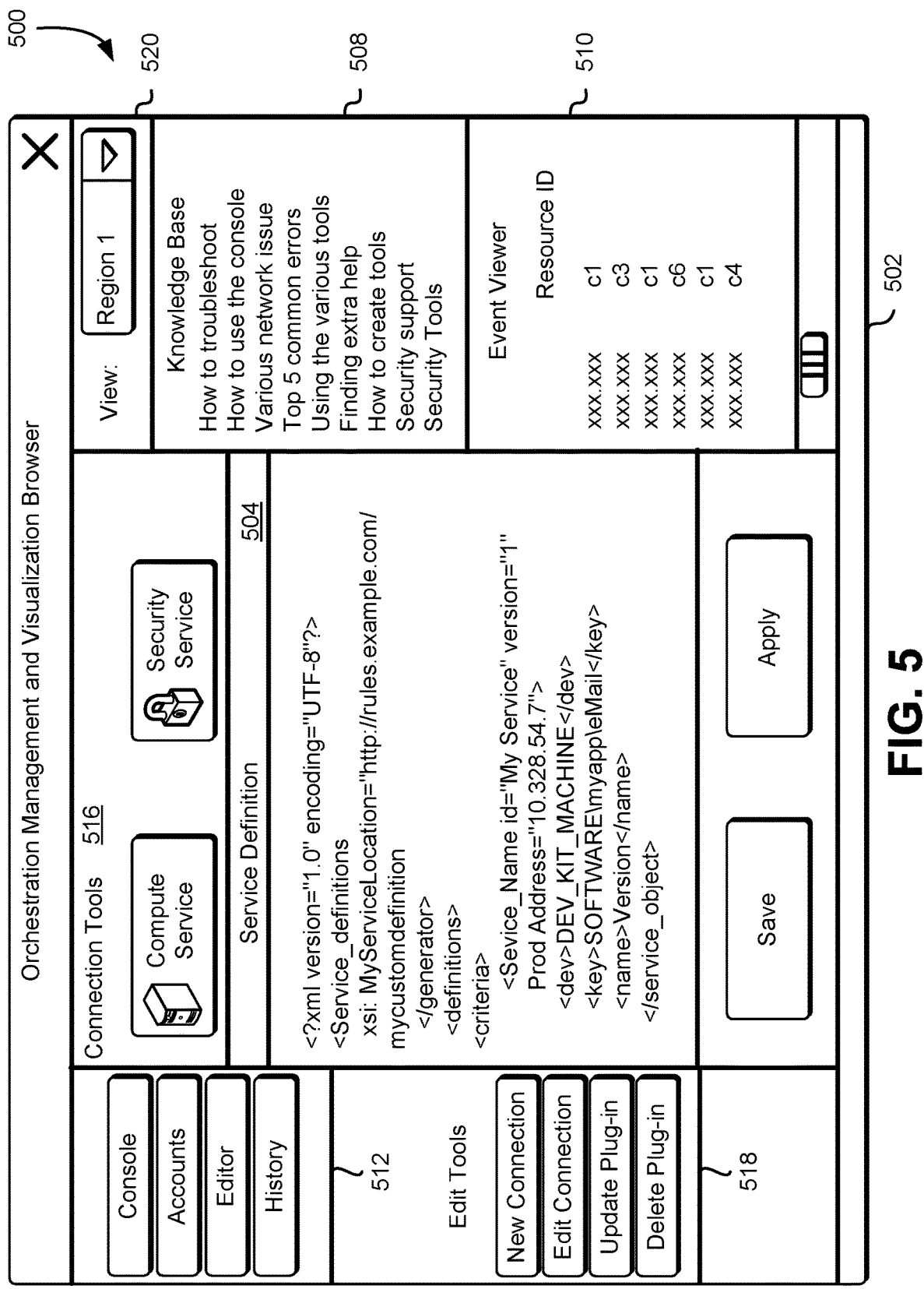
FIG. 5 is a diagram illustrating a management console exposed as a webpage for providing a service definition in accordance with at least one embodiment.

FIG. 5 illustrates an example environment 500 where a remote orchestration management and visualization browser 502 may be used to create and/or modify a service definition as described in the present disclosure at least as described above in connection with FIG. 1 and in accordance with at least one embodiment. The remote orchestration management and visualization browser 502 enables a customer to generate service definitions, detect attempts to establish a connection with a service, perform security operations, troubleshoot issues associated with computing resources of a service, receive recommendations associated with the service architecture, search a knowledge base for information related to the computing resources, view service baselines, and generally diagnose, establish, and troubleshoot relationships between services. In various embodiments, the remote orchestration management and visualization browser 502 is a computer system service such as a web service and provided as an orchestration service of the computing resource service provider as described in the present disclosure.

As illustrated in FIG. 5, the remote orchestration management and visualization browser 502 is provided as a user interface executed by an application, such as a web browser executing on a computer system operated by the customer, as well as other user interfaces that may be used to present service information and relationship information to the customer and may, in some embodiments, be generated by the computing resource service provider and sent to the customer's display for rendering. The remote orchestration management and visualization browser 502 may include additional embodiments and features as described above in connection with FIG. 3. In addition, the remote orchestration management and visualization browser 502 may include connection tools 516, a set of options 512, event viewer 510, region selection 520, knowledge base 508, and editing tools 518 as described above in connection with FIG. 3.

As illustrated by FIG. 5, the remote orchestration management and visualization browser 502 also includes service definition display plane 504. The service definition display plane 504 includes a graphical user interface element that accepts user input from the customer and enables the customer to create and edit service definitions. As described above, the service definition includes information associated with a service such as service name, service address, public network addresses, private network addresses, network information, computing resource information, customer information, policy information, credential information, or any other information associated with a service.

As illustrated in FIG. 5, the service definition is created in a particular programming language such as Extensible Markup Language (XML) and stored in a particular data object such as a JSON file as described above. In several embodiments, the service definition is maintained in an unstructured data format. In general, the service definition provides the orchestration service with information suitable for establishing a relationship between a service associated with the service definition and at least one other service. As described in greater detail below, the orchestration service establishing a relationship between services by executing a set of plug-ins where each plug-in of the set of plug-ins includes a workflow that when executed establishes the relationship between the services. In various embodiments, the orchestration service may determine a particular workflow or set of workflows to execute based at least in part on information associated with the service. For example, compliance with a particular standard (e.g., payment card industry standards) may not allow a particular type of connection;

as a result the orchestration service determines not to execute workflows associated with the particular type of connection.

Figure 6:
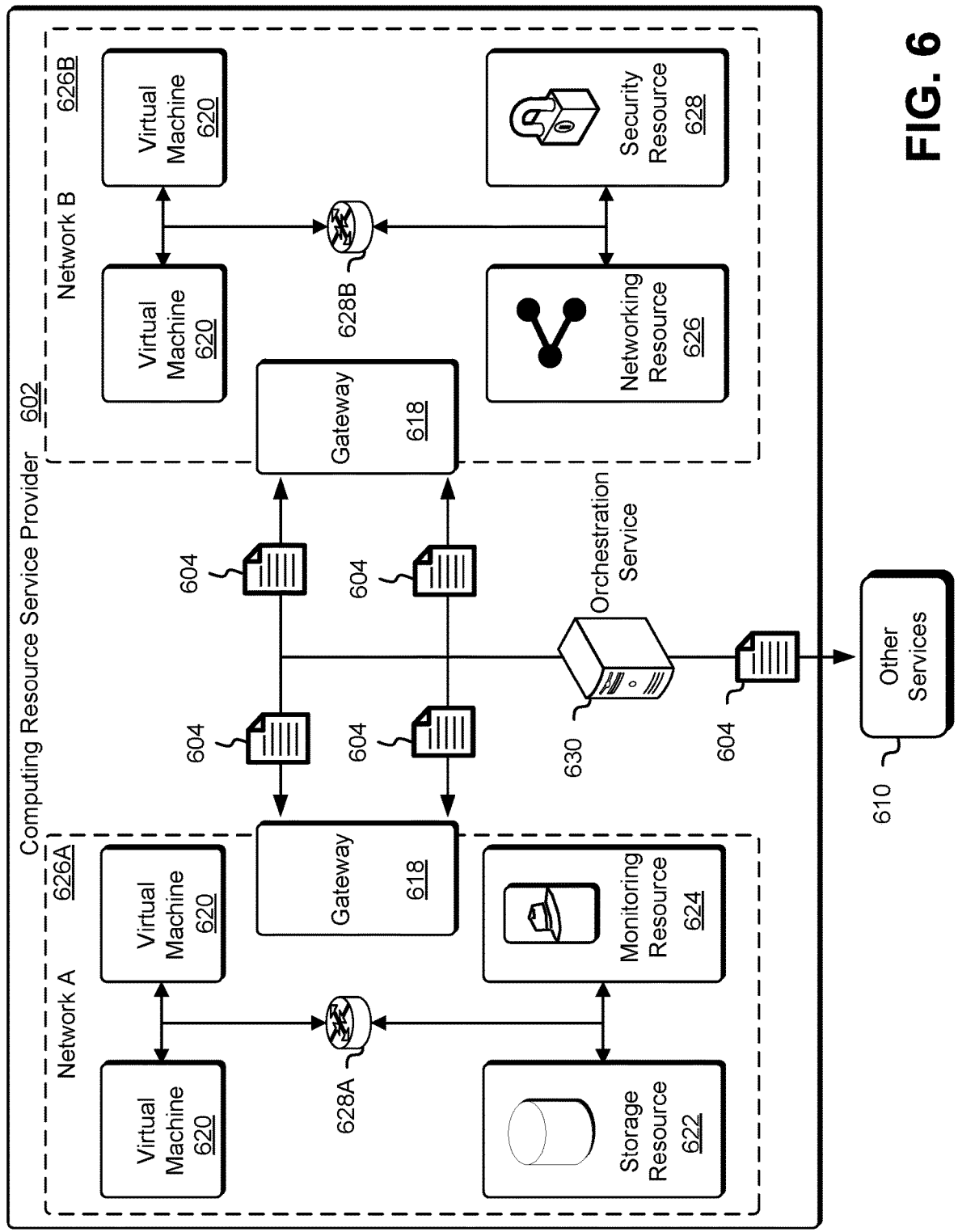
FIG. 6 illustrates an environment in which an orchestration service negotiates a relationship between two or more services in accordance with at least one embodiment.

FIG. 6 illustrates an aspect of an environment 600 in which an embodiment may be practiced. Specifically, FIG. 6 depicts the execution of one or more plug-ins by an orchestration service 630 which causes the computing resources executing the one or more plug-ins to transmit relationship information 604 to various services illustrated in FIG. 6. The environment 600 may include various services supported and/or implemented by various computing resources executed by servers in the sets of racks. For example, a virtualization layer executing on the server computer in the sets of racks enables the physical hardware of the services to be used to provide computational resources upon which one or more virtual machines 620 or other computing resources may operate. The virtualization layer enables the virtual machines 620 to access physical hardware on the server computer through virtual device drivers or other executable code on the virtual machine 620. The virtual machine 620 may include any number of computer systems and applications executed by services of the computing resource service provider. For example, the virtual machine 620 implements a monitoring resource 624.

As illustrated in FIG. 6, the set of racks include a number of different computing resources of various services such as storage resources 622, networking resource 626, security resource 628, and monitoring resource 624. Each particular computing resource may be utilized by one or more services to perform various operations. For example, an on-demand storage service, as described above, utilizes the storage resource 622 to provide storage for customers on the on-demand storage service. In addition, a specific plug-in may be associated with each type of computing resource, the specific plug-in specifying a set of operations to establish a relationship with the associated type of computing resource.

The computing resources (e.g., virtual machine 620) may be placed on the servers according to a rack diversity constraint, where the sets of racks may be localized by different networks 626A-626B. The relationship information 604 may include information as described above; the relationship information may be obtained from different service definitions maintained by the orchestration service 630. The orchestration service 630 may be a computing system of one or more computing systems that provides relationship information 604 to one or more computing resources associated with various services. Furthermore, the orchestration service 630 may include computer systems that execute plug-ins and generate service calls that are consumed by various computing resources, for example, as the networking resources 626.

The sets of racks may be physical hardware (e.g., server computers as described above) hosting one or more servers, or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. Additionally, the set of racks may be a "brick server" or other server that is a compact computer server module without a chassis that may include various processors, RAM, I/O, and storage configurations and may be designed to fit into various rack locations. The set of racks may also be connected by a top of rack switch.

The networks 626A-626B may be data communication pathways between one or more electronic devices. The networks 626A-626B may be wired or wireless networks and may use any of a variety of communications protocols for organizing their network traffic. The networks 626A-626B may allow the sharing of files, data, and other types of information between the one or more electronic devices accessible through the data communication pathways. Each of the networks 626A-626B may be associated with a router, such as an aggregation router that aggregates the servers of the respective set of racks into the common network, separate from the router associated with the other network. Each of the networks 626A-626B may be on a different subnet than the other network. For example, as illustrated in FIG. 6, the servers of the set of racks may be commonly connected to a router 628A. Similarly, the servers of the set of racks may be commonly connected to a router 628B. The routers 628A-628B may be networking devices that forward packets between computer networks, such as between the networks 626A-626B.

The environment 600 may also include a gateway 618 that receives network traffic directed to computing systems and/or computing resources, such as virtual machines 620, executed by servers in the sets of racks and enables interfacing with another network, such as the Internet, that may use different protocols. The gateway 618 may contain computing devices such as protocol translators, impedance matching devices, rate converters, fault isolators, or signal translators as necessary to provide system interoperability, such as performing protocol conversion to enable computing devices to communicate between networks. In addition, the gateway 618 may also direct the relationship information 604 to a particular computing resource, such as the security resource 628. Once the relationship information 604 is received by the computing resources (e.g., a service frontend for a policy management service), the computing resources may process the relationship information 604 to at least establish a portion of a particular relationship the orchestration service 630 is attempting to establish. The orchestration service 630, in various embodiments, transmits relationship information to other services 610 executed by an entity distinct from the computing resource service provider 602, such as a customer operated data center.

Figure 7:
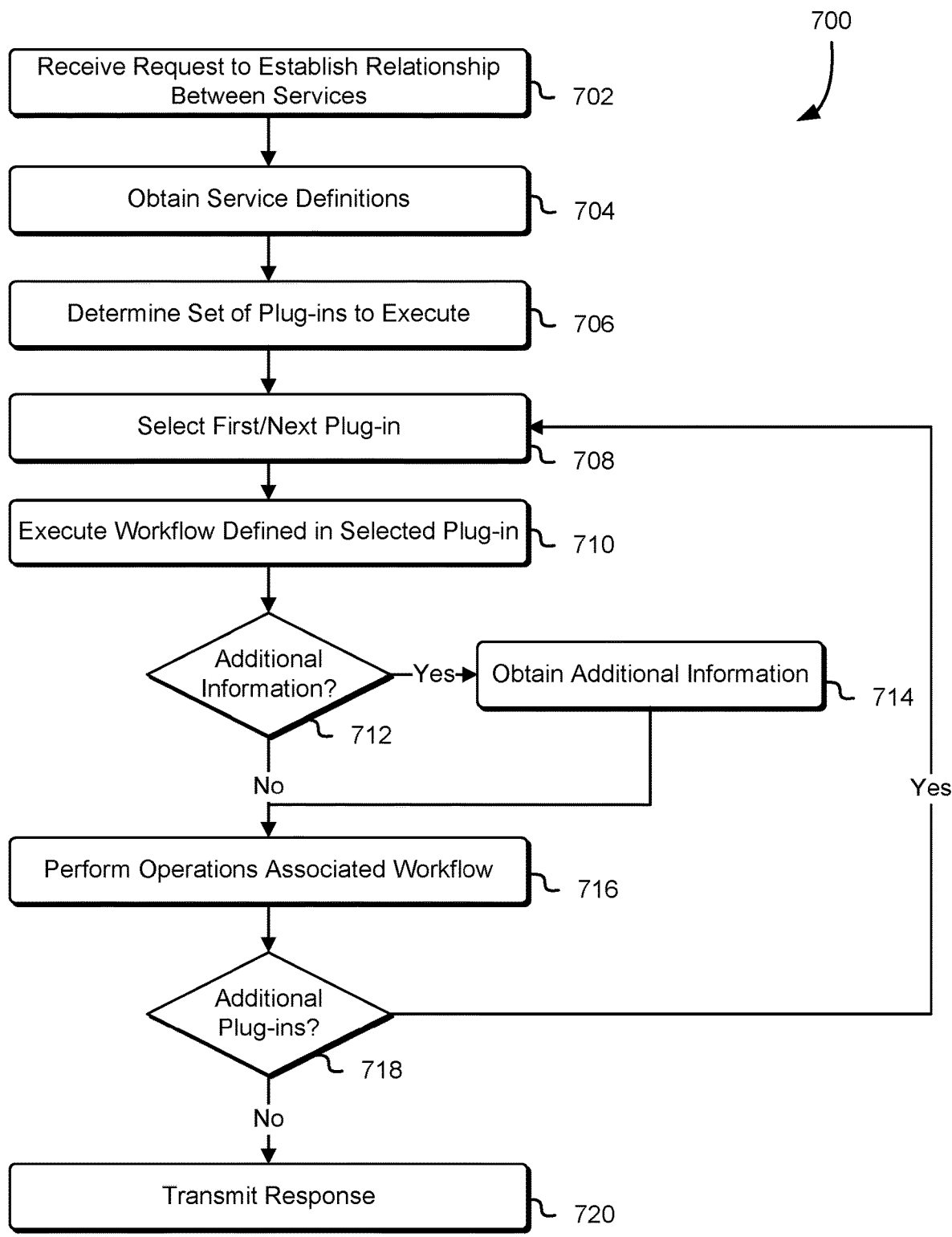
FIG. 7 shows an illustrative process which may be used to establish relationships between services in accordance with at least one embodiment.

FIG. 7 is a block diagram illustrating an example of a process 700 for establishing a relationship between two or more services in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as the orchestration service 130, by multiple computing devices in a distributed system of a computing resource service provider, or by a service provided by a computing resource service provider. The process 700 includes receiving a request to establish a relationship between services 702. The request may be obtained from a customer through a management console as described above. In yet other embodiments, the request is generated automatically in response to one or more triggers such as the customer providing a new or updated service definition. The request may indicate a type of relationship to establish and one or more services to establish the relationship with. For example, the request may indicate to establish a network connection relationship between a service operated by the customer and a particular computing resource of a particular service (e.g., a particular data store of an on-demand storage service).

The orchestration service may then, in response to receiving the request or as part of a process for fulfilling the request, obtain service definitions 704. The service definitions may include information about a particular service as described above. In addition, the service definitions may be maintained by the orchestration service and may be indexed so that the orchestration service can search for and obtain specific service definitions (e.g., service definitions associated with the request). The orchestration service, in an embodiment, obtains the service definition associated with the service included in the request. For example, the request indicates to establish a relationship between a customer operated service and a policy management service, where the relationship includes a set of network addresses associated with the customer operated service to be whitelisted for connections to at least one other service.

Returning to FIG. 7, the orchestration service may then determine a set of plug-ins to execute 706. The orchestration service may make the determination based at least in part on information included in the service definitions, the request, the type of relationship to be established, or other information suitable for establishing a relationship between services. In various embodiments, the orchestration service executes all plug-ins for any particular service definition. In such embodiments, if the service definition does not have the required information to execute a particular plug-in, the particular plug-in may fail or otherwise be terminated prior to completion of the plug-in. As described in greater detail below, the plug-ins may include various workflows defining operations to establish a relationship with a particular service. For example, a particular plug-in for establishing a network connection with a networking service includes a workflow that defines a set of operations including API calls to establish the network connection.

The orchestration service then selects the first/next plug-in of the set of plug-ins to execute 708. The plug-ins may be executed by computing resources of the orchestration service as described above. Furthermore, the orchestration service may execute the workflow defined in the selected plug-in 710. In various embodiments, the workflow may be subdivided into a plurality of workflows based at least in part on the computer systems executing the operations of the workflow. In addition, the workflow may be executed by a task service as described above. The computer system executing the workflow may obtain information from the service definition. For example, the workflow may include an API call, the parameters for which are obtained from the service definition.

Furthermore, the orchestration service may determine if additional information is needed for execution of the workflow 712. For example, if the service definition does not include certain information, or if credential information is required, this information may be obtained from a source other than the service definition. If addition information is need, the orchestration service then obtains additional information 714. For example, the orchestration service may prompt the customer for additional information through a management console as described above. In another example, the additional information is obtained from one or more other services. Once the additional information is obtained or no additional information is required, the orchestration service may perform the operations associated with the workflow 716. For example, the orchestration service may use the information obtained from the service definition and/or additional information to generate a set of service calls that when executed establish the requested relationship between the services.

The orchestration service may then determine if there are additional plug-ins to execute 718. If there are additional plug-ins, the orchestration service may return to step 708 and select the next plug in. If there are no additional plug-ins, the orchestration service transmits a response 720. The response may include various responses, such as a notification to the customer that the relationship is established or that one or more plug-ins failed. In addition, the response may be transmitted to a computing resource of the service to indicate to the service that a particular relationship has been established. For example, the response may be transmitted to a service to indicate that a particular network connection has been established between a network associated with the service and a network associated with at least one other service.

Note that one or more of the operations performed in 702-720 may be performed in various orders and combinations, including in parallel. For example, the system executing the process 700 may execute a plurality of plug-ins in parallel. In numerous variations to the process 700, one or more of the operations 702-716 may be omitted or performed by other systems or services. For example, the orchestration service may not transmit a response 720.

Figure 8:
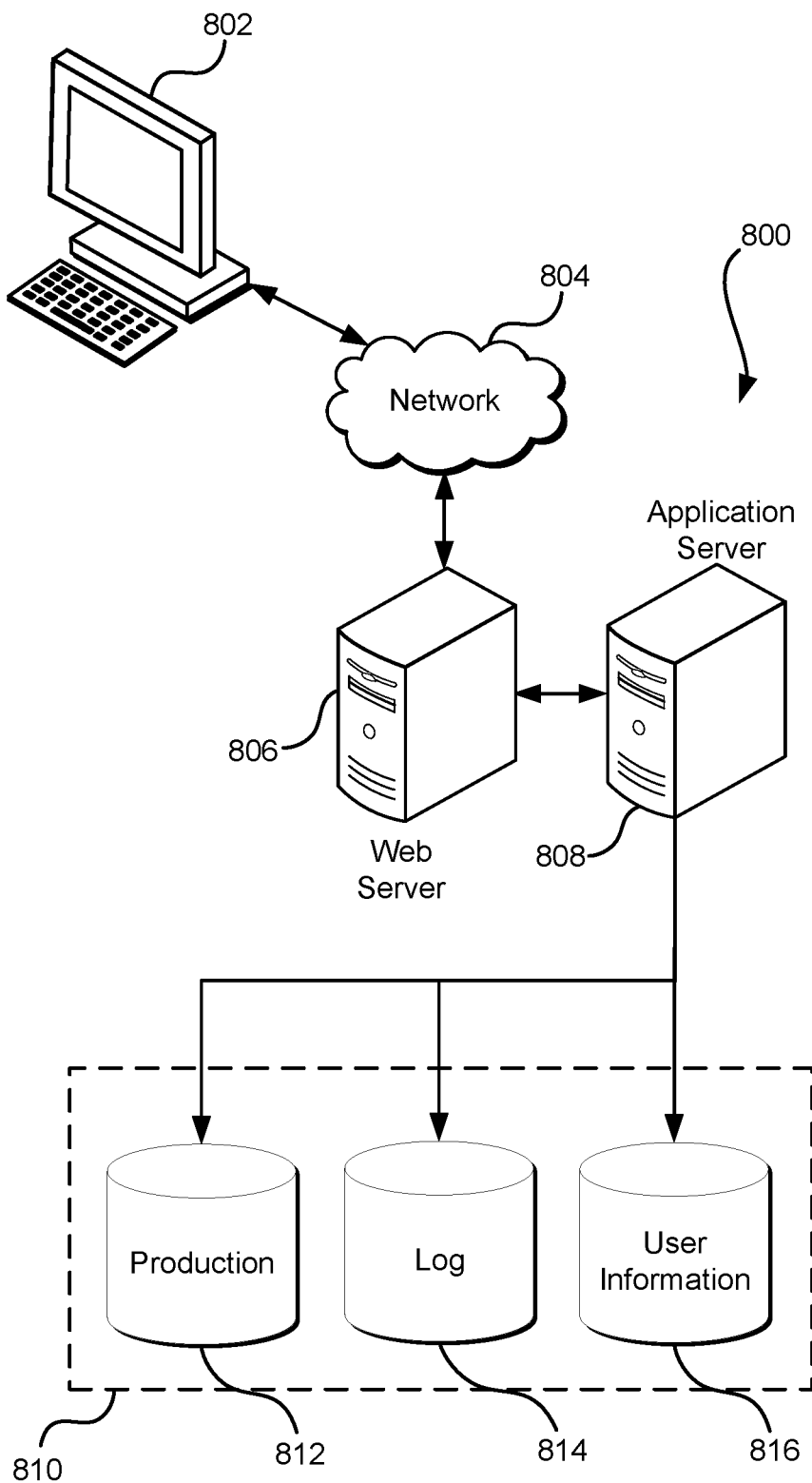
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes a client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable, and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A, or B, or C, or any nonempty subset of the set of A, and B, and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
continuously monitoring, by an orchestration service, a set of service configurations wherein each service configuration contains a plurality of service definitions for a set of services, wherein each service definition includes information that defines a set of attributes of a first service and a second service, and each service configuration establishes a first service relationship between the first service and the second service of the service configuration by a respective security policy that is managed by plug-ins of the first and second service, wherein the security policy specifies a communication privilege between the first and second services of the service configuration;
from the continuously monitoring, determining that the service relationship between the first service and the second service of a first service configuration of the set of service configurations is unnecessary for continued operation of the first service and the second service based at least in part on detecting that the respective security policy of the first service configuration has an over-inclusive communication privilege indicating that the service relationship is no longer necessary with the second service and must be denied;
based on the detection of the over-inclusive communication privilege, determining the plug-ins that managed the service relationship between the services of the first service configuration and performing steps of:
notifying, by the orchestration service, the plug-ins of the first and second service in the first service configuration to transmit one or more requests to a policy server, wherein the request to the policy server is to modify the respective security policy for the first service and the second service of the first service configuration, and wherein the modification is to deny communication between the first service and the second service;
based on the modification to the first security policy, generating a set of workflows associated with the plug-ins of the first service and the second service; and
executing the set of workflows by:
  determining a first set of attributes for the first service based at least in part on a first service definition of the set of service definitions;
  determining a second set of attributes for the second service based at least in part on a second service definition of the set of service definitions;
  denying the communication between the first service and the second service; and
  based on the first set of attributes and the second set of attributes, performing a subset of the set of workflows different from the workflows corresponding to the denied communication between the first service and the second service.

2. The computer-implemented method of claim 1, wherein the computer-implemented method further comprises:
  obtaining configuration information for a set of services, the configuration information indicating at least a set of connections between services of the set of services; and
  generating information indicating a modification to connections associated with the first service based at least in part on the configuration information.

3. The computer-implemented method of claim 1, wherein the computer-implemented method further comprises:
  obtaining utilization information for a set of services, the utilization information indicating at least a set of privileges associated with the set of services; and
  determining a set of baseline privileges for the first service based at least in part on the utilization information.

4. The computer-implemented method of claim 1, wherein set of operations comprises a first operation of the set of operations, and wherein the first operation includes a service call to a computer system.

5. A system, comprising:
at least one computing device implementing one or more services,
wherein the one or more services:
  continuously monitor a set of service configurations wherein each service configuration contains a plurality of service definitions for a set of services, wherein each service definition includes information that defines a set of attributes of a first service and a second service and each service configuration establishes a first service relationship between the first service and the second service of the service configuration by a respective security policy that is managed by plug-ins of the first and second service, wherein the security policy specifies a communication privilege between the first and second services of the service configuration;
  from the continuously monitoring, determine that the first service relationship between the first service and the second service of a first service configuration of the set of service configurations is unnecessary for continued operation of the first service and the second service based at least in part on detecting that the respective security policy of the first service configuration has an over-inclusive communication privilege indicating that the first service relationship is no longer necessary with the second service and must be denied;
  based on the detection of the over-inclusive communication privilege, determine the plug-ins that managed the first service relationship between the services of the first service configuration and perform steps to:
    notify the plug-ins of the first and second service in the first service configuration to transmit one or more requests to a policy server, wherein the request to the policy server is to modify the respective security policy for the first service and the second service of the first service configuration, and wherein the modification is to deny communication between the first service and the second service:
    based on the modification to the first security policy, generate a set of workflows associated with the plug-ins of the first service and the second service:
    execute the set of workflows by performing further steps to:
      determine a first set of attributes for the first service based at least in part on a first service definition of the set of service definitions;
      determine a second set of attributes for the second service based at least in part on a second service definition of the set of service definitions;
      deny the communication between the first service and the second service; and
      based on the first set of attributes and the second set of attributes, perform a subset of the set of workflows different from the workflows corresponding to the denied communication between the first service and the second service.

6. The system of claim 5, wherein the one or more services:
  detect an attempt to establish a second service relationship with the second service; and
  provide a notification to a customer associated with the second service indicating whether the second service relationship is established.

7. The system of claim 5, wherein each of the service definitions further comprises information defining a computing resource that processes data.

8. The system of claim 5, wherein a first operation of a set of operations, as a result of being executed by the system, causes the system to modify the first service definition maintained by the system.

9. The system of claim 5, wherein executing the set of workflows further includes determining the set of workflows based at least in part on information associated with the first service.

10. The system of claim 5, wherein the one or more services:
  detect an error in executing a first operation of a set of operations; and
  revert the first service to a previous state, prior to attempting to establish the relationship between the first service and the second service.

11. The system of claim 5, wherein a first operation of a set of operations, as a result of being executed by the system, causes the system to transmit a request to a policy server to allow the first service to access a resource of the second service.

12. The system of claim 5, wherein a first operation of a set of operations, as a result of being executed by the system, causes the system to transmit a service call to a network security service, the service call indicating a set of network addresses to be included in a white list, thereby enabling the first service to communicate with the second service.

13. A non-transitory computer-readable storage medium having stored thereon executable instructions that, as a result of being executed by one or more processors of a computer system, cause the computer system to at least:
   continuously monitor a set of service configurations wherein each service configuration contains a plurality of service definitions for a set of services, wherein each service definition includes information that defines a set of attributes of a first service and a second service, and each service configuration establishes a first service relationship between the first service and the second service of the service configuration by a respective security policy that is managed by plug-ins of the first and second service, wherein the security policy specifies a communication privilege between the first and second services of the service configuration;
   from the continuously monitoring, determine that the first service relationship between the first service and the second service of a first service configuration of the set of service configurations is unnecessary for continued operation of the first service and the second service based at least in part on detecting that the respective security policy of the first service configuration has an over-inclusive communication privilege indicating that the first service relationship is no longer necessary with the second service and must be denied;
   based on the detection of the over-inclusive communication privilege, determine the plug-ins that managed the first service relationship between the services of the first service configuration and perform steps to:
      notify the plug-ins of the first and second service in the first service configuration to transmit one or more requests to a policy server, wherein the request to the policy server is to modify the respective security policy for the first service and the second service of the first service configuration, and wherein the modification is to deny communication between the first service and the second service;
      based on the modification to the first security policy, generate a set of workflows associated with the plug-ins of the first service and the second service;
      execute the set of workflows by performing further steps to:
         determine a first set of attributes for the first service based at least in part on a first service definition of the set of service definitions:
         determine a second set of attributes for the second service based at least in part on a second service definition of the set of service definitions;
         deny the communication between the first service and the second service; and
         based on the first set of attributes and the second set of attributes, perform a subset of the set of workflows different from the workflows corresponding to the denied communication between the first service and the second service.

14. The non-transitory computer-readable storage medium of claim 13, wherein the instructions that cause the computer system to determine the set of workflows associated with the first service and the second service further include instructions that cause the computer system to determine the set of workflows such that execution of the set of workflows generates a network connection between a first private network associated with the first service and a second private network associated with the second service.

15. The non-transitory computer-readable storage medium of claim 13, wherein the instructions that cause the computer system to determine the set of workflows associated with the first service and the second service further include instructions that cause the computer system to determine the set of workflows such that execution of the set of workflows generates a connection between an instance associated with the first service and at least one computing resource associated with the second service.

16. The non-transitory computer-readable storage medium of claim 13, wherein the instructions further comprise instructions that, as a result of being executed by the one or more processors, cause the computer system to:
   determine a set of relationships that are not currently being used by the first service; and
   transmit a notification to a user associated with the first service indicating at least one relationship of the set of relationships can be terminated.

17. The non-transitory computer-readable storage medium of claim 13, wherein the instructions further comprise instructions that, as a result of being executed by the one or more processors, cause the computer system to index the first service definition such that a query can be generated to locate information stored within the first service definition.

18. The non-transitory computer-readable storage medium of claim 13, wherein the instructions further comprise instructions that, as a result of being executed by the one or more processors, cause the computer system to transmit a notification to a customer associated with the first service, the notification indicating at least one additional relationship between two or more additional services based at least in part on the first service definition.

19. The non-transitory computer-readable storage medium of claim 13, wherein the instructions further comprise instructions that, as a result of being executed by the one or more processors, cause the computer system to execute a plurality of plug-ins maintained by the computer system, a plug-in of the plurality of plug-ins is associated with a type of relationship that can be established between the first service and the second service and the plug-in defining the set of workflows.

20. The non-transitory computer-readable storage medium of claim 19, wherein the instructions that cause the computer system to execute the plurality of plug-ins further include instructions that cause the computer system to:
   determine the service definition lacks information utilized during execution of the plug-in; and
   terminate execution of the set of workflows.

* * * * *